United States Patent
Hilt et al.

(10) Patent No.: US 8,565,117 B2
(45) Date of Patent: Oct. 22, 2013

(54) SYSTEMS AND METHODS FOR NETWORK ROUTING

(75) Inventors: Volker Friedrich Hilt, Middletown, NJ (US); Markus Andreas Hofmann, Fair Haven, NJ (US); Srinivasan Seetharaman, San Francisco, CA (US); Mostafa H. Ammar, Smyrna, GA (US)

(73) Assignees: Alcatel Lucent, Paris (FR); Georgia Tech Research Corporation, Atlanta, GA (US)

( * ) Notice: Subject to any disclaimer, the term of this patent is extended or adjusted under 35 U.S.C. 154(b) by 537 days.

(21) Appl. No.: 12/007,741

(22) Filed: Jan. 15, 2008

(65) Prior Publication Data
US 2009/0180480 A1    Jul. 16, 2009

(51) Int. Cl.
| | |
|---|---|
| *H04L 12/28* | (2006.01) |
| *H04L 1/00* | (2006.01) |
| *H04L 12/26* | (2006.01) |
| *H04J 1/16* | (2006.01) |
| *H04J 3/14* | (2006.01) |
| *H04L 12/66* | (2006.01) |

(52) U.S. Cl.
USPC ............................ 370/254; 370/238; 370/353

(58) Field of Classification Search
USPC ................. 370/254, 329, 351, 132, 408, 239, 370/236.1, 390, 392, 238, 353; 709/231, 709/239, 236, 227, 228, 217, 238, 224
See application file for complete search history.

(56) References Cited

U.S. PATENT DOCUMENTS

2005/0015511 A1*  1/2005  Izmailov et al. .............. 709/238

OTHER PUBLICATIONS

Ammar, "Preemptive Strategies to Improve ROuting Performance of Native and Overlay Layers", May 2007, IEEE INFOCOM, all pages.*
Ammar2, "Characterizing and Mitigating Inter-domain Policy Violations in Overlay Routes", Nov. 2006, IEEE ICNP, all pages.*
Ammar3, "Resolving Cross-Layer Conflct between Overlay Routing and Traffic Engineering", 2009, ACME/IEEE Transactions of Networking, all pages.*
Seetharaman, "Corss-Layer Interactiosn in Overlay Networks", Aug. 2007, Georgia Institute of Technology, all slides.*
Seetharaman2007, "Preemptive Strategies to Improve Routing Perfromance of Native and Overlay Layers", IEEE INFOCOM 2007, May 6-12, 2007, all pages.*

* cited by examiner

*Primary Examiner* — Kwang B Yao
*Assistant Examiner* — Adam Duda
(74) *Attorney, Agent, or Firm* — Harness, Dickey & Pierce

(57) ABSTRACT

A network may include a plurality of nodes forming a first layer and a sub-set of the plurality of nodes forming a second layer. The first layer may follow a first routing objective in routing traffic, and the second layer may develop constraints based on the first routing objective and follow a second routing objective within the developed constraints in routing traffic. In another network, the second layer may follow a second routing objective in routing traffic, and the first layer may develop constraints based on the second routing objective and follow a first routing objective within the developed constraints in routing traffic.

12 Claims, 3 Drawing Sheets

SYSTEMS AND METHODS FOR NETWORK ROUTING

BACKGROUND

1. Field

Example embodiments are related to systems and/or methods for network routing, and for example, to systems and/or methods for improving routing performance of native and overlay layers of a network.

2. Background

Overlay networks, i.e., overlay layers, have recently gained attention as a viable alternative to overcome functionality limitations (e.g., lack of quality of service (QoS), difficulty in geo-positioning, multicast support, etc.) of the Internet. The basic idea of overlay layers is to form a virtual network on top of the physical network so that overlay nodes may be customized to incorporate more complex functionality without modifying native routers. A conventional routing method for an overlay layer is designed to sense the characteristics of an underlying native network, i.e. native layer, and dynamically adapt the overlay layer's routing tables in a selfish manner to the characteristics of the underlying native network to offer enhanced routing performance to the overlay layer's traffic.

However, in a resource constrained world, where the native layer performs traffic engineering (TE), the selfish behavior of the overlay layer in making routing decisions may cause problems in a network, for example, poorer network performance (e.g., higher delay, higher jitter, lower throughput), traffic route oscillations, increased routing cost, and resource starvation. Instability and sub-optimality is exacerbated if there is a conflict in objective between the overlay layer and the native layer. For example, a conflict may occur between conventional overlay routing aiming to minimize latency between the nodes of the overlay layer and conventional traffic engineering aiming to balance load in the underlying native layer.

SUMMARY

Example embodiments may provide systems and/or methods in which an overlay layer or a native layer of a network uses a proactive routing strategy to better achieve routing goals.

According to an example embodiment, a network may include a plurality of nodes forming a first layer and a sub-set of the plurality of nodes forming a second layer. The first layer may follow a first routing objective in routing traffic. The second layer may develop constraints based on the first routing objective and follow a second routing objective within the developed constraints in routing traffic.

According to an example embodiment, a network may include a plurality of nodes forming a first layer and a sub-set of the plurality of nodes forming a second layer. The first layer may follow a first routing objective in routing traffic. The second layer may follow a second routing objective in routing traffic. The first layer may develop constraints based on the second routing objective and follow the first routing objective within the developed constraints in routing traffic.

According to an example embodiment, a method may include routing traffic, by a plurality of nodes forming a first network layer, according to a first routing objective. Constraints on a second routing objective based on the first routing objective may be developed. Traffic may be routed, by a sub-set of the plurality of nodes forming a second network layer, according to the second routing objective and the developed constraints.

According to an example embodiment, a method may include developing constraints on a first routing objective based on a second routing objective. Traffic may be routed, by a plurality of nodes forming a first network layer, according to the first routing objective and the developed constraints. Traffic may be routed, by a sub-set of the plurality of nodes forming a second network layer, according to the second routing objective.

According to an example embodiment, a method may include providing a plurality of nodes configured to form a first layer and a sub-set of the plurality of nodes configured to form second layer. The first layer may follow a first routing objective in routing traffic. The second layer may develop constraints based on the first routing objective and follow a second routing objective within the developed constraints in routing traffic.

According to an example embodiment, a method may include providing a plurality of nodes configured to form a first layer and a sub-set of the plurality of nodes configured to form a second layer. The first layer may follow a first routing objective in routing traffic. The second layer may follow a second routing objective in routing traffic. The first layer may develop constraints based on the second routing objective and follow the first routing objective within the developed constraints in routing traffic.

BRIEF DESCRIPTION OF THE DRAWINGS

The above and/or other aspects and advantages will become more apparent and more readily appreciated from the following detailed description of example embodiments taken in conjunction with the accompanying drawings of which.

DETAILED DESCRIPTION OF EXAMPLE EMBODIMENTS

Figure 1:
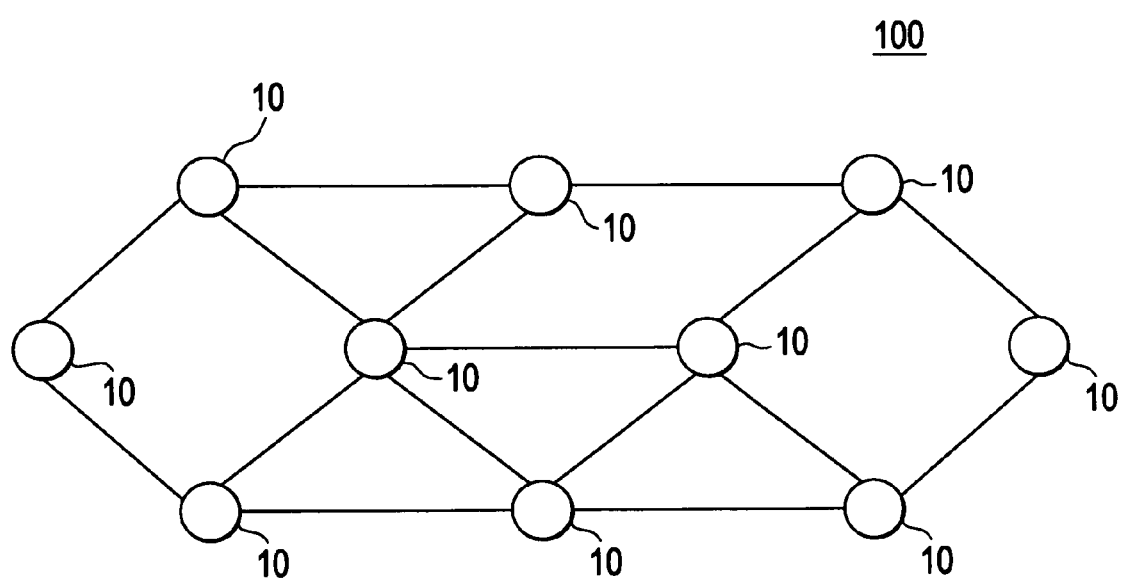
FIG. 1 is an example topology of a system including a native layer and an overlay layer.

Example embodiments will now be described more fully hereinafter with reference to the accompanying drawings. Embodiments may, however, be in many different forms and should not be construed as being limited to the example embodiments set forth herein. Rather, these example embodiments are provided so that this disclosure will be thorough and complete, and will fully convey the scope to those skilled in the art.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

FIG. 1 is an example topology of a network including a native layer and an overlay layer.

Referring to FIG. 1, a native layer may include each node of a plurality of nodes 10 in the network 100, and/or an overlay layer may include a sub-set of the plurality of nodes 10 in the network 100, i.e., a sub-set of the plurality of nodes 10 in the native layer. The native layer may employ traffic engineering in routing traffic, and/or the overlay layer may employ overlay routing in routing traffic.

Traffic engineering is a crucial procedure in modern internet service provider ISP networks to balance load and remove bottlenecks. Traffic engineering may use estimated traffic demand matrixes to derive sets of routes that achieve a specific load-balancing objective. For example, the estimated traffic demand matrix, e.g., a snapshot of the traffic demand, may be the amount of traffic that is expected to be put onto the network. The estimated traffic demand matrix may be what is used by traffic engineering to determine the amount of traffic that is expected to be put on the network. A traffic demand matrix may be the actual traffic that is on the network. For example, the traffic demand matrix may be the traffic that is being fed into the network by clients. The estimated traffic demand matrix may be effectively modeling the traffic expected to be fed into the network. The routing tables for each layer may be used to forward the traffic along specific links. For example, a routing table may tell overlay routing or traffic engineering where to send traffic for a certain destination. If a node gets traffic with destination m, the routing table may tell the device that the next hop towards the destination m would be node n. Accordingly, the node may forward the traffic for destination m to node n. With the traffic demand matrix and the current routing tables, overlay routing or traffic engineering may determine the load on a specific link. A frequency of re-engineering the routes may depend on an amplitude of change in the traffic demand matrix or a desired periodicity. Traffic engineering may have an objective to minimize an overall cost of the network or to minimize maximum link utilization in the network. The maximum link utilization may be the utilization of the link in a network that is used the most, and/or minimizing the maximum utilization may have a goal of reducing the load on the link that has the highest utilization. For example, a cost may be associated with each unit of traffic that is carried over a link. The cost for each unit on a link may be set to increase as the link gets filled up. In attempting to minimize an overall cost of the network, traffic engineering may try to ensure that link utilization stays below the capacity limit and that link utilization on all links is kept lower.

If the goal of traffic engineering is to minimize an overall cost of the network, a cost $\varnothing(a)$ of an individual link a may be modeled using a piecewise-linear, increasing convex function.

If the goal of traffic engineering is to minimize the maximum link utilization in the network, a utilization of an individual link a is defined as the ratio between a cumulative load $X_a$ in the link and a capacity $C_a$ of the link. For example, a link may have a capacity limit which is the maximum amount of traffic a link may carry.

Traffic engineering may be implemented by means of multi-protocol label switching (MPLS), where the traffic between two nodes is partitioned and transported over one or more pre-configured tunnels. Another way of implementing traffic engineering is by means of the open shortest path first/intermediate system to intermediate system (OSPF/ISIS) protocol, where interior gateway protocol (IGP) link metrics are optimized to approximate a solution of multi-protocol label switching traffic engineering (MPLS-TE). Because MPLS achieves a more optimal traffic engineering objective, MPLS is used as an example method when describing the interaction between conventional overlay routing and conventional traffic engineering below.

The native layer may be modeled as a directed graph G=(V, E), where V is the set of nodes in the native layer and E is the set of directed links with finite capacity constraints in the native layer. The latency of each physical link, i.e., each native link, may be the sum of a propagation delay and a queuing delay for the native link. Queuing delay may be negligible in comparison to the propagation delay or queuing delay may be non-negligible in comparison to the propagation delay.

The overlay layer may be managed by a single operator and offer latency-optimized paths to actual end systems. However, an overlay layer may also be managed by multiple operators or built to offer other services. The overlay layer may maintain a routing table that is independent of the underlying network, i.e., the native layer, and/or deploy some form of dynamic overlay routing to adapt to changing conditions in the native layer. According to standard terminology well known in the art, an overlay link represents a direct route between two overlay nodes, which in turn includes of one or more native links, and an overlay path includes one or more overlay (e.g., virtual) links. An overlay path represents the end-to-end route taken by application traffic.

The overlay layer may be modeled as a directed graph G'=(V', E'), with V' being the set of nodes and E' being the set of edges. The overlay layer may have mesh connectivity of overlay links between the overlay nodes. The overlay layer periodically monitors the state of the overlay links and the latency incurred by each of the overlay links. Based on collected data, the overlay layer may perform some form of link state routing to optimize the objective of the overlay layer.

Conventional overlay routing for the overlay layer and conventional traffic engineering for the native layer operate solely on the results of the network monitoring process and are otherwise oblivious to the dynamics of the other layer. The independent operation of routing protocols in the two layers may cause misalignment of objectives and misdirection of traffic demand matrix estimation.

In an attempt to derive the shortest possible paths, conventional overlay routing tends to reuse a shorter overlay link in multiple paths. Accordingly, the load on the native route escalates beyond an expected demand, thereby triggering actions by traffic engineering. Similarly, in an effort to balance load, conventional traffic engineering may shift traffic to native routes that span under-utilized regions in the network, causing a stretch in the overlay link latency. Therefore, serious misalignment in objectives caused by the above factors leads to contention and associated route oscillations occur.

Conventional traffic engineering used by ISPs relies on an estimate of the traffic demand matrix. The use of an overlay network, irrespective of the traffic engineering protocol or objective, may cause the estimated traffic demand matrix to not be reflective of the actual end-to-end source-destination demand. Accordingly, there is a certain amount of misdirection in the load-based optimization procedure of conventional traffic engineering. For example, if there is traffic on two overlay paths A-B and A-B-C. The native layer cannot differentiate the traffic on the overlay link A-B based on the true destination. Therefore, the load distribution process becomes more rigid.

The interaction between conventional overlay routing and conventional traffic engineering is non-cooperative and recurring. Each layer optimizes the routes to suit the local objective of the layer in succession. The duration between two iterations of traffic engineering may be referred to as a round. The number of overlay routing operations between two traffic engineering operations may vary based on a probing frequency.

In a network, any reconfiguration in one layer's routes leads to a change in the other layer's state (e.g., link load profile in the case of traffic engineering or link latency profile in the case of overlay routing). Accordingly, a network employing conventional overlay routing and conventional traffic engineering takes longer to stabilize in the presence of resource constraints.

Depending on the traffic engineering objective, the routing performance of the native layer may be measured, for example, by native cost or maximum utilization. If a system, e.g., an ISP, chooses to minimize the overall cost incurred by the overall network, the routing performance of the native layer may be measured by native cost. Native cost NC is computed according to the following equation:

$$NC = \Sum_{a \in E} \phi(a) \quad (1)$$

where a represents a link in the set of edges E and ø is the summation of the piecewise integral of the cost increase function. If the objective of the system, e.g., an ISP, is to minimize the maximum link utilization observed in the overall network the routing performance of the native layer may be measured by maximum utilization. Maximum utilization $\max_a$ is computed according to the following equation:

$$\max_{a \in E} \frac{X(a)}{C(a)} \quad (2)$$

where a represents a link in the set of edges E, $X_a$ is a cumulative load in the link, and $C_a$ is a capacity of the link.

The routing performance of the overlay layer may be measured by average latency. Average latency is defined as the average of the end-to-end latencies observed across all overlay paths with non-zero traffic demand.

If a conflict in the objective between the overlay layer and the native layer exists, a system tends to become unstable, leading to frequent alterations in the routes taken by existing traffic. These changes in routes may happen to all flows at the end of traffic engineering, or just to overlay flows at the end of each overlay routing. Each such route change is referred to as a route flap. Route flaps may be a serious problem in case of transmission control protocol TCP, voice over internet protocol VoIP, and other traffic that relies on packet ordering and is sensitive to jitter. As a result, the end-to-end performance of the system is hurt. The route flaps may serve as an indication of instability in the system and/or as a performance metric. If route flaps are serving as a performance metric, the number of route flaps is computed as the sum of route changes observed in existing flows after a routing operation.

During the multi-layer interaction of overlay routing and traffic engineering, there are operating points where the performance of a particular layer has the best performance possible. If the performance of a layer is the best performance possible, the performance may be referred to as the best-case, or optimal, performance of the layer. Best-case performance may be computed as the minimum of the objective value attained in any of the rounds. The objective value is a value that characterizes the objective of the respective layer, e.g., maximum link utilization or average latency. However, a layer is usually unable to retain best-case performance, as the other layer annuls the best-case performance during routing operations.

For a network employing conventional overlay routing and conventional traffic engineering, each traffic engineering procedure tends to increase the average end-to-end latency of existing overlay paths, while each overlay routing operation tends to increase the maximum utilization of the native layer. Accordingly, a clear conflict in objective between the two layers exists and gives sufficient reason for the instability of the network. Due to a probing frequency, a duration of suboptimality for conventional traffic engineering may be longer in comparison to that for conventional overlay routing.

As noted above, the number of route flaps gives a numerical estimate of the instability in the network. A system employing conventional routing methods suffers from persistent route flaps and may take longer to attain or may never attain a stable operating point. The number of route flaps observed during traffic engineering serves as an estimate of the instability prevalent in all native routes.

The introduction of queuing delay may reduce the amount of variation caused in the maximum utilization value for a system employing the conventional routing methods. The reduction in the amount of variation caused in the maximum utilization value may be attributed to the closed loop feedback inherent to queuing. For example, if overlay routing selects a lower delay link for multiple routes, the load on a selected link tends to increase, leading to an increase in queuing delay, and therefore a cessation of using the selected link and a reduction of the load on the selected link. Accordingly, the objectives of the two layers may be less conflictive in a case where queuing delay is non-negligible in comparison to the propagation delay. However, more minor unrest in overlay routing in the presence of more substantial queuing delay may occur even in the absence of traffic engineering.

If the traffic engineering objective is to minimize the native cost and the queuing delay is non-negligible, the objective of traffic engineering and overlay routing may be in lesser conflict with each other. Therefore, the objective of minimizing native cost tends to keep the load on all links lower, thereby reducing queuing delay and consequentially the average latency of the overlay paths. On the other hand, overlay routing avoids overloading links, thereby reducing the native cost. Accordingly, the conflict between conventional traffic engineering and conventional overlay routing is relatively less, yet still significant, in the case where the traffic engineering objective is to minimize native cost and the queuing delay in non-negligible.

A higher number of overlay nodes causes higher conflict. The higher conflict may be explained by inspecting a number of multi-hop overlay paths. Multi-hop overlay paths are defined as an overlay path which is not the same as the directed native route. A multi-hop overlay path may be the primary reason why the native layer traffic demand matrix estimation, e.g., the real traffic demand matrix estimation, is misdirected. For instance, if two nodes always communicate along the direct native route, the traffic engineering is able to load balance more easily. Accordingly, the higher the number of multi-hop overlay paths, the higher the conflict between traffic engineering and overlay routing.

Regardless of the size of the native topology and the overlay topology, the occurrence of route flaps depends mainly on how conducive the overall network is to forming multi-hop overlay paths.

Increasing total load in the network stresses traffic engineering further and causes traffic engineering to pick routes that are far more widespread. Accordingly, the link latencies as seen by overlay routing are higher, giving overlay routing more reason to pick multi-hop overlay paths; thereby causing a higher variation in traffic engineering outcome.

Accordingly, as noted above the conflicting objectives of the native and overlay layers may cause undesired instability in a network.

Example embodiments may provide strategies that obtain the best possible performance for a particular layer of a network including an overlay layer and a native layer by predicting or counteracting the other layer's reaction, while steering the system towards a more stable state. A layer which makes a first unconventional route adjustment may be referred to as a leader and the layer which reacts to the first unconventional route adjustment may be referred to as a follower. The strategies provided by example embodiments may be referred to as preemptive strategies because the strategies allow one layer to more firmly assert performance without future deterioration. For example, the leader may pick more optimal routes for which the follower has no other alternative or volition but to retain the same routes.

If the leader is the overlay layer, preemptive strategies for overlay routing according to an example embodiment may have an objective to minimize an end-to-end latency of overlay paths. For example, if overlay applications are able to estimate the characteristics of the underlying native layer and are able to sufficiently predict the behavior of the native layer for a certain load distribution, overlay routing may minimize the end-to-end latency of overlay paths without any future deterioration.

If the leader is the native layer, preemptive strategies for traffic engineering may have an objective to minimize a maximum link utilization or to minimize an overall network cost. For example, if the native layer is aware of the selfish overlay layer and is able to sufficiently predict the behavior of the overlay layer for a certain network topology, traffic engineering may minimize the maximum link utilization or minimize the overall network cost without any future deterioration.

However, predicting the behavior of a layer may not be a pragmatic solution. Overlay layers and native layers may maintain independent routing tables and have different network span, thereby making the procurement of complete knowledge about the other layer's function unrealistic. The prediction process may attempt contrive a relationship between the latency objective of the overlay layer and the load balancing objective of the native layer; however, such a relation does not exist in reality. Determining the exact routes to be prescribed by each layer, even in the presence of complete information, may be a difficult problem.

Example embodiments may work around the above limitations by profiling the multi-layer interaction, and/or allow the leader to proactively prepare for the follower's reaction (e.g., response). For example, preemptive strategies according to example embodiments may represent a repeated game, where the players (e.g., a leader and a follower) have continuous sequential interaction. Accordingly, a leader may capitalize on historical observations and gradually learn desired actions.

Preemptive strategies according to example embodiments for each layer may be one of two types, friendly or hostile. In a friendly strategy, one layer may pick routes in such a manner that the performance of the one layer is improved without defeating the objective of the other layer. Alternatively, a hostile strategy may improve the performance of one layer primarily by defeating the objective of the other layer, and giving the other layer relatively minimal or no chance for recuperation. For example, a fundamental idea behind a hostile strategy may be that the leader may cause irrecoverable problems for the follower in an effort to leave the follower no other viable options than the one preferred by the leader.

Preemptive strategies according to example embodiments may achieve nearer to optimal performance, and/or converge within a few rounds of interaction. The strategies may be more simply and easily deployable, may not require any cooperation or interface between layers, and/or may work with relatively negligible information about each layer. Accordingly, the preemptive strategies may reduce instability (e.g., persistent route oscillations) generally observed in non-cooperative interaction, without compromising on route optimality.

For example, social optimum may be defined as the action-reaction pair that produces the best outcome for both layers in a system. The social optimum is a parameter that may help to derive an estimate of the degree of non-cooperation (e.g., anarchy) in the system. In an ideal system, the social optimum would be the desired operating point for both layers. However, lack of sufficient knowledge to exactly predict the other layer's response may make deriving the social optimum non-trivial. For example, an overlay layer that spans only a fraction of a native layer may only choose among the set of native routes the overlay layer is exposed to and is unaware of a potential shorter route with lower load. The social optimum may be inexistent in certain scenarios of conflicting objectives. Accordingly, example embodiments may attempt to achieve the best possible performance for a particular layer, even at the expense of the other layer.

Preemptive strategies according to example embodiments may target a particular layer, with the assumption that the other layer does not deviate from a general objective. Each layer may have a general notion of the other layer's objective. The strategies may apply certain heuristics to converge at a nearer to optimal routing table within polynomial time. The preemptive strategies need not require any other information besides what is reported by basic network monitoring. The preemptive strategies may require no cooperation or interface between the two layers, and/or exercise sufficient control over the follower indirectly. For example, each layer may be run by a different service provider and there may be no need for the two service providers to exchange information, even if each layer is run by a same service provider. The system may be self configuring and there may be no need for the layers to have an interface or to exchange information. Therefore, the strategies according to example embodiments may be more easily implemented in a realistic environment.

Preemptive strategies according to example embodiments in which an overlay layer is a leader are discussed below with reference to FIG. 2.

Preemptive strategies according to example embodiments may help the overlay layer preemptively steer the multi-layer interaction towards a converging point, wherein the performance of the overlay routing is almost as good as (or as good as) a case where there is no reprisal from the native layer traffic engineering. The preemptive strategies may make certain calculated routing decisions at the overlay layer to ensure that traffic engineering does not get triggered because network monitoring has not sensed any changes or traffic engineering cannot not find any alternatives besides the current routing table.

The preemptive strategies may be classified, based on their nature towards the native layer, as friendly or hostile. The friendly strategy may pick routes in such a manner that the traffic engineering objective is not altered much (or at all) and/or the native layer still has a well-balanced load, while the hostile strategy may perform extra operations to achieve the overlay layer objective by defeating the traffic engineering objective. The preemptive strategies according to example embodiments may apply to both traffic engineering objectives and to both levels of queuing delay described above.

Figure 2:
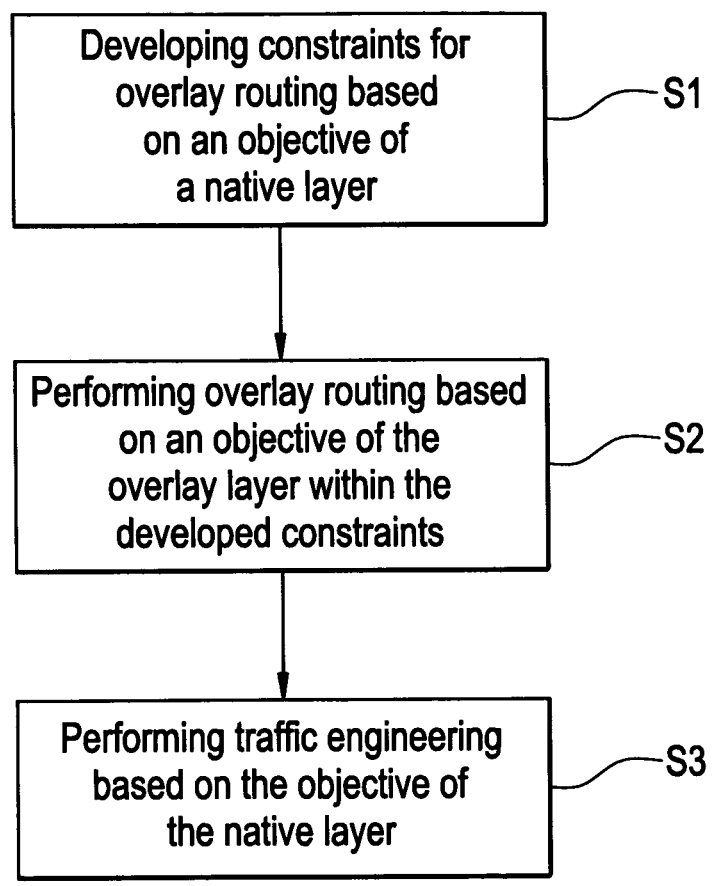
FIG. 2 is flow chart illustrating a method for network routing in which an overlay layer is a leader according to an example embodiment.

Referring to FIG. 2 constraints for overlay routing may be developed based on an objective of a native layer (S1). Overlay routing may be performed based on an objective of an overlay layer within the developed constraints (S2). Traffic engineering may be performed based on the objective of the native layer (S3). Example embodiments disclosed in FIG. 2 show step (S1) before step (S2) and step (S2) before step (S3), however, example embodiments are not limited thereto and steps (S1), (S2), and/or (S3) may be performed in another order.

A friendly overlay strategy may make use of the fundamental idea that traffic engineering may see only the real traffic demand matrix and not the end-to-end overlay traffic demand matrix. Accordingly, if overlay routing determines the load distribution in the network after traffic engineering's load balancing operation and ensures that any future routing at the overlay layer always contributes the same load to the real traffic demand matrix, traffic engineering may have no reason to be triggered. For example, the objective of the native layer may not be violated.

Accordingly, overlay routing may adopt the following algorithm detailed below.

The available bandwidth in each overlay link may be determined, e.g., using tools like Pathload which are well-known in the art. The minimum of the available bandwidth in each overlay link over all links may be referred to as a minimum available bandwidth min(availbw). For example, min(availbw) is the available bandwidth of the link that currently has the lowest available bandwidth. The available bandwidth on all links may be kept above the minimum available bandwidth min(availbw), for example, as part of step (S1).

A maximum allowable load on each overlay link used by overlay traffic may be set to the amount of overlay traffic on that link, for example, as part of step (S1). The amount of overlay traffic on a link may be computed by a product of the overlay traffic demand matrix and the overlay routing table. For example, a product of the overlay traffic demand matrix and the overlay routing table may be computed by taking the traffic demand, e.g., source: A to destination: B, and computing which links this demand would use following the current overlay routing tables, e.g., A-C-B. However, the above computation may be conservative because there may be more leeway in setting the maximum allowable load, and example embodiments are not limited thereto.

A maximum allowable load on each unused overlay link a, i.e. an overlay link that transports no overlay traffic, may be set to a value of an available bandwidth on link a availbw(a) minus the minimum available bandwidth min(availbw), for example, as part of step (S1). Therefore, overlay routing may ensure that the traffic engineering objective is still respected.

A linear program (LP), in accordance with the above constraints, may be run to determine the overlay routes, for example, as part of step (S2). The linear program LP may minimize the sum of the latency of each overlay path, while ensuring that the load on each overlay link is within the allowable limit in accordance with the following equation:

$$\min \text{Total Latency} = \sum_{(s,t) \in V' \times V'} \text{latency}(s, t) \quad (3)$$

subject to:

$$\sum_{(x,y) \in E'} F_{(x,y)}^{(s,t)} - \sum_{(y,z) \in E'} F_{(y,z)}^{(s,t)} = \begin{cases} -1, & \text{if } y = s \\ 1, & \text{if } y = t \\ 0, & \text{otherwise} \end{cases} \forall y, s, t \in V'$$

$$\text{latency}(s, t) = \sum_{(x,y) \in E'} \text{delay}(x, y) \times F_{(x,y)}^{(s,t)} \ \forall \ (s, t) \in V' \times V'$$

$$\sum_{(s,t) \in V' \times V'} \text{overlay\_demand}(s, t) \times F_{(x,y)}^{(s,t)} \leq L(x, y) \ \forall \ (x, y) \in E'$$

wherein overlay_demand(s,t) is the traffic demand between nodes s and t, $F_{(x,y)}^{(s,t)}$ is the fraction of traffic between nodes s and t that goes over overlay link (x,y), $F_{(y,z)}^{(s,t)}$ is the fraction of traffic between the nodes s and t that goes over overlay link (y,z), L(x,y) is a maximum allowable load in the current round of overlay routing for the overlay link (x,y), latency(s,t) is the end-to-end latency between nodes s and t, delay(x,y) is the latency of the link (x,y) between the nodes x and y, V' is the set of nodes in the second layer including nodes s, t, x, y, and z, and E' is the set of links in the second layer including the links (x,y) and (y,z).

Accordingly, overlay routing according to example embodiments may be able to reduce the average latency achieved without causing an increase in the maximum utilization. The friendly overlay routing strategy described above may be referred to as a friendly load-constrained strategy. The above algorithm may be stabilized within one round and/or require data from only the previous round.

Overlay routing according to another example embodiment may use a gradient projection strategy that shifts overlay paths from more highly used overlay links to less used overlay links, while accepting a minor loss in performance. The gradient projection strategy may serve as a form of load-balancing at the overlay layer so that traffic engineering will not react to the overlay routing. A gradient projection strategy is based on the assumption that the popularity (e.g., betweenness) of certain nodes or links in an overlay network is much more than a few others. Therefore, an objective of the gradient projection strategy may be to reduce this non-uniformity without causing a substantial increase in end-to-end latency. However, the overlay routing performance achieved by deploying the gradient projection strategy may be inferior to that achieved by the load-constrained LP strategy.

A hostile overlay strategy may send dummy traffic on unused overlay links, i.e. overlay links that transport overlay traffic, with the motives of rendering traffic engineering ineffective and/or shifting the concern of traffic engineering, for example as a part of (S2). By sending dummy traffic, the overlay layer may ensure that the objective of traffic engineering is stretched up to an extent where the objective of traffic engineering becomes ineffective and has no effect on existing overlay routes. Therefore, the overlay layer may have complete freedom in picking routes and overloading certain links if traffic engineering is rendered ineffective. By sending dummy traffic, the overlay layer may shift concern of traffic engineering to the over-utilized native links and/or allow the other less loaded native routes to use the least possible resources. Therefore, a higher probability of attaining shorter native routes for the overlay links may exist if the concern of traffic engineering is shifted.

Accordingly, sending dummy traffic may reduce deterioration in overlay routing performance during future rounds. The strategy of sending dummy traffic may be counter-productive with regards to overall system health. However, as long as the overlay links with dummy traffic do not intersect with overlay links with overlay traffic, the risk incurred for the overlay network (e.g., in the form of queuing delay or packet loss) may be relatively minimal. Therefore, overlay routing may send dummy traffic only over links which are unused by any overlay route and/or non-overlapping with links under use, for example as a part of steps (S1) and (S2). To ensure that overlay routing is sending dummy traffic only over links which are non-overlapping with links under use, an overlay network may need to use a tool such as the traceroute program, which is well known in the art, between the endpoints of each overlay link. Overlay routing may send dummy traffic only over links which are non-overlapping in both the forward and reverse direction.

If overlay routing sends dummy traffic over unused non-overlapping links the traffic engineering objective may be completely violated, while achieving better performance for the overlay layer. The strategy of sending dummy traffic may be able to achieve better performance in fewer rounds, e.g., in a second round, with no knowledge of previous load distribution.

If the overlay layer is the leader, the friendly and hostile overlay routing strategies may attain close to optimal average latency values, and/or the stability of the overall system may be improved. The native and overlay routes may have no route flaps beyond a second round, thereby indicating that the system may attain a steady state within a few rounds.

The friendly overlay routing strategy may sacrifice some performance to reduce distortion of the traffic engineering objective, while the hostile overlay routing strategy may achieve the best possible performance for the leader at the expense of the follower's performance.

Preemptive strategies according to example embodiments in which a native layer is a leader are discussed below with reference to FIG. 3.

Preemptive strategies according to example embodiments may help the native layer to preemptively steer the multi-layer interaction towards a more favorable converging point. Similar to the strategies discussed above for the overlay layer as the leader, preemptive traffic engineering strategies may be classified, based on their nature towards the follower, as friendly or hostile. The preemptive traffic engineering strategies described below may apply to both objectives of traffic engineering and to both levels of queuing delay discussed above.

Figure 3:
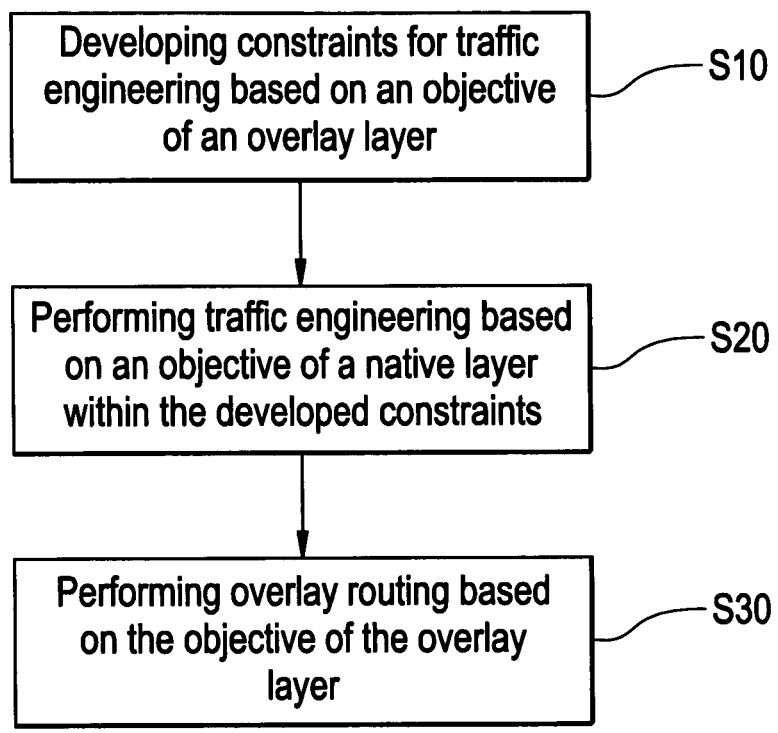
FIG. 3 is flow chart illustrating a method for network routing in which a native layer is a leader according to an example embodiment.

Referring to FIG. 3 constraints for traffic engineering may be developed based on an objective of an overlay layer (S10). Traffic engineering may be performed based on an objective of a native layer within the developed constraints (S20). Overlay routing may be performed based on the objective of the overlay layer (S30). Example embodiments disclosed in FIG. 2 show step (S10) before step (S20) and step (S20) before step (S30), however, example embodiments are not limited thereto and steps (S10), (S20), and/or (S30) may be performed in another order.

A friendly native strategy according to an example embodiment may adjust the MPLS-TE formulation in such a manner that during each load balancing effort, the traffic engineering following the friendly native strategy may take special care to keep the native routes at a same length as before, for example as a part of step (S10). Accordingly, the overlay layer may not notice any changes in perceived overlay link latencies. The simple constraint on the native route length may keep overlay routing from being triggered, and/or may help retain a better load balance.

Accordingly, traffic engineering may adopt the algorithm detailed below.

After each traffic engineering operation, the total hopcount H(s, t) of each native route (s, t) may be computed. The total hopcount H(s, t) of each native route (s, t) may be computed in accordance with the following equation:

$$\rho_{(x,y)\in E} f_{(x,y)}^{(s,t)} \quad (4)$$

wherein $f_{(x,y)}^{(s,t)}$ is the fraction of traffic between nodes s and t that goes over native link (x, y). The fraction of traffic between nodes s and t that goes over native link (x, y) may be the output of the MPLS-TE's linear program LP formulation. Accordingly, the hopcount profile H may tend to approximate a latency profile of the overlay layer.

The hopcount profile of the previous round may be used as input to compute a new set of native routes that are of almost the same length (or the same length). The linear program LP of MPLS-TE, with an objective of minimizing the maximum utilization, may be augmented to enforce the constraint on the lengths of the new set of native routes, for example as a part of step (S20), in accordance with the following equation:

$$\min \text{ Maximum } util = \max_{(x,y)\in E} \frac{load(x, y)}{capacity(x, y)} \quad (5)$$

subject to:

$$\sum_{(x,y)\in E} f_{(x,y)}^{(s,t)} - \sum_{(y,z)\in E} f_{(y,z)}^{(s,t)} = \begin{cases} -1, & \text{if } y = s \\ 1, & \text{if } y = t \\ 0, & \text{otherwise} \end{cases} \forall y, s, t \in E$$

$$load(x, y) = \sum_{(s,t)\in V\times V} demand(s, t) \times f_{(x,y)}^{(s,t)} \forall (x, y) \in E$$

$$\sum_{(x,y)\in E} f_{(x,y)}^{(s,t)} \leq 1.02 \times H(s, t)_{prev} \forall (s, t) \in V \times V$$

wherein $f_{(x,y)}^{(s,t)}$ is the fraction of traffic between nodes s and t that goes over native link (x, y), load(x,y) is the load on the link (x,y), capacity(x,y) is a traffic capacity of link (x,y), demand(s,t) is a traffic demand between nodes s and t, H(s, t) is the total hopcount between nodes s and t in the native layer computed as $\Sigma_{(x,y)\in E} f_{(x,y)}^{(s,t)}$, H(s,t)$_{prev}$ is the hopcount of a traffic path between nodes s and t in the native layer computed in a previous iteration of load balancing, V is the set of nodes in the native layer including nodes s, t, x, y, and z, and E is the set of links in the native layer including the links (x,y) and (y,z).

The constraint on the lengths of the new set of native routes may be introduced to remove a need for overlay route change. The upper bound of the hopcount may be multiplied by a multiplier, e.g., about 1.02, to allow the native layer a bit more flexibility in adjusting routes, thereby allowing the system to be closer to the optimal load balancing. Although the hopcount and not the actual latency value may be restricted, the approximation may reduce implementation complexity and/ or may be sufficient to achieve better performance.

Accordingly, traffic engineering according to an example embodiment may learn the hopcounts used by each native route over the initial rounds and eventually obtain a hopcount profile that correlates relatively well with the overlay link latencies. Therefore, the linear program LP used by the traffic engineering may be able to balance the load and keep the overlay link latencies the same, thereby leading to steady state. Accordingly, better performance for both layers may be achieved.

Traffic engineering according to another example embodiment may use a load unbalancing strategy that tweaks the objective of traffic engineering, with an intent to attain stability indirectly. The goal of the load unbalancing strategy may be to skew the load balancing process in such a way that the skewing causes some links to achieve a link utilization in a desired, or alternatively, a predetermined range, e.g., a range of 0.3 to 0.6, and verify if the achieved link utilization benefits system stability in the multi-layer scenario, for example as a part of step (S10). The counter-intuitive load unbalancing strategy may obtain near-optimal traffic engineering performance, which may cause the oscillations to converge in fewer rounds. However, the load unbalancing strategy may have inferior performance compared to the hopcount-constrained LP strategy.

Traffic engineering may adjust the network to an optimal load distribution for most (or all) traffic matrices. However, traffic engineering may not account for future alterations of the traffic demand matrix made by overlay routing. Therefore, a better strategy for retaining a good load balance may be to restrict changes caused by overlay routing. Changes caused by overlay routing may be restricted by restricting the relay of overlay traffic in certain parts of the network in an effort to keep the overlay layer from changing current routes, distributing load in such a manner that the overlay layer finds insufficient resources (or) higher queuing delay on heavily used overlay links, and/or manipulating the latency (or any other metric that is of interest to the overlay layer) of all traffic on certain native links in such a manner that the overlay layer is offered an incentive or discentive to maintain the same routing table, for example as a part of step (20).

The above strategies for restricting changes caused by overlaying routing may lead to a deterioration in overlay performance and/or may affect the experience of the end user. However, they have a difference in their motivation, the first two approaches may discriminate against overlay traffic (and thereby raises concerns of net neutrality), while the third approach may equally affect all traffic.

Accordingly, the third approach of manipulating the latency (or any other metric that is of interest to the overlay) of all traffic on certain native links in such a manner that the overlay layer is offered an incentive or disincentive to maintain the same routing table may be implemented by a hostile load-based traffic engineering strategy according to an example embodiment in the manner described below.

For example, the hostile load-based traffic engineering strategy may constantly monitor utilization on all native links. If the utilization is greater than or equal to a first amount, e.g., 1, the latency on the specific link may be increased by 3 times a constant c ms. For example, the native layer may be capable of increasing the latency of certain links by any means known in the art. However, if the utilization is greater than the maximum link utilization observed at the end of traffic engineering, the latency on the specific link may be increased by the constant c ms. The above process may be repeated until an acceptable maximum link utilization value is obtained.

The hostile load-based traffic engineering strategy may gradually learn which native links are more key to overlay networks and/or tend to dissuade usage of these key links. Accordingly, the native layer may be able to more rapidly decrement the number of multi-hop overlay paths and attain steady state within fewer rounds, e.g., within a first round. By indirectly increasing the latency, the native layer may avoid having to explicitly identify the overlay traffic in the native network.

Therefore, the native layer may be able to achieve the best load balancing at the expense of the overlay layer, and also to rid the system of further route flaps. Therefore, the hostile load-based traffic engineering strategy may not be as counter-productive as the hostile strategy proposed for the overlay layer.

Accordingly, example embodiments may provide preemptive routing strategies that obtain the best possible performance for a particular layer of a network including an overlay layer and a native layer by predicting or counteracting the other layer's reaction, while steering the system towards a more stable state. The preemptive strategies may be simpler and easier to use, may not require any cooperation or interface between the layers, and/or may work with relatively negligible information about each layer.

Example embodiments are described above with reference to a native layer or an overlay layer developing constraints based on a routing objective of the other layer and routing traffic based on the developed constraints and a routing objective of the layer developing the constraints. However, example embodiments are not limited thereto. For example, the native layer may develop constraints based on a routing objective of the overlay layer and the overlay layer may develop constraints based on a routing objective of the native layer. Accordingly, a layer may deploy a preemptive strategy even if the other layer is deploying a preemptive strategy. Accordingly, both the native layer and the overlay layer may proactively consider a reaction of the other layer in routing traffic in the same network.

Although example embodiments have been shown and described in this specification and figures, it would be appreciated by those skilled in the art that changes may be made to the illustrated and/or described example embodiments without departing from their principles and spirit.

What is claimed:

1. A method for routing a data packet, the method comprising:
    determine, by a switching node, if a first network or a second network is a leader, the first network including a first plurality of switching nodes following a first routing objective, the second network including a second plurality of switching nodes, the second plurality of switching nodes being a sub-set of the first plurality of switching nodes, the second plurality of switching nodes following a second routing objective, at least one of the first network and the second network is an overlay network; and
    if the first network is the leader,
        determining, by the switching node, constraints based on the second routing objective, and
        routing, by the switching node, the data packet based on the first routing objective and the determined constraints of the second routing objective;
    if the second network is the leader, determining, by the switching node, constraints based on the first routing objective, and routing, by the switching node, the data packet based on the second routing objective and the determined constraints of the first routing objective.

2. The method of claim 1, wherein
the first plurality of switching nodes follow the first routing objective within the determined constraints in routing traffic without exchanging information with the second plurality of switching nodes, and
the second plurality of switching nodes follow the second routing objective in routing traffic without exchanging information with the first plurality of switching nodes.

3. The method of claim 1, wherein the switching node determines the constraints by proactively considering a reaction of the second plurality of switching nodes following the second routing objective in routing traffic to traffic routing at the first plurality of switching nodes.

4. The method of claim 3, wherein
the first routing objective is to at least one of balance load in one of the first network and the second network and minimize an overall cost of one of the first network and the second network,
the second routing objective is to minimize end-to-end latency of traffic paths in the second plurality of switching nodes, and
the first plurality of switching nodes follow the first routing objective within the determined constraints in routing traffic by balancing load in the first plurality of switching nodes while maintaining traffic paths in the first plurality of switching nodes at a same length such that latencies of links in the second plurality of switching nodes are not changed.

5. The method of claim 4, wherein the switching node balances load in the first plurality of switching nodes while maintaining the traffic paths in the first plurality of switching nodes at the same length such that the latencies of the links in the second plurality of switching nodes are not changed in accordance with the following equation:

$$\min \text{Maximum } util = \max_{(x,y) \in E} \frac{\text{load}(x, y)}{\text{capacity}(x, y)}$$

subject to:

$$\sum_{(x,y) \in E} f_{(x,y)}^{(s,t)} - \sum_{(y,z) \in E} f_{(y,z)}^{(s,t)} = \begin{cases} -1, & \text{if } y = s \\ 1, & \text{if } y = t \\ 0, & \text{otherwise} \end{cases} \forall y, s, t \in E$$

$$\text{load}(x, y) = \sum_{(s,t) \in V \times V} \text{demand}(s, t) \times f_{(x,y)}^{(s,t)} \ \forall (x, y) \in E$$

$$\sum_{(x,y) \in E} f_{(x,y)}^{(s,t)} \le 1.02 \times H(s, t)_{prev} \ \forall (s, t) \in V \times V$$

wherein $f_{(x,y)}^{(s,t)}$ is an amount of traffic between nodes s and t in the first plurality of switching nodes that goes over a link (x,y) between nodes x and y in the first plurality of switching nodes, load(x,y) is the load on the link (x,y), capacity(x,y) is the traffic capacity of link (x,y), demand (s,t) is a traffic demand between nodes s and t, H(s,t) is the total hopcount between nodes s and t in the first plurality of switching nodes computed as $\Sigma_{(x,y) \in E} f_{(x,y)}^{(s,t)}$, $H(s,t)_{prev}$ is the hopcount of a traffic path between nodes s and t in the first plurality of switching nodes computed in a previous iteration of load balancing, V is the set of nodes in the first plurality of switching nodes including nodes s, t, x, and y, and z, and E is the set of links in the first plurality of switching nodes including the links (x,y) and (y,z).

6. The method of claim 3, wherein
the first routing objective is to at least one of balance load in one of the first network and the second network and minimize an overall cost of one of the first network and the second network,
the second routing objective is to minimize end-to-end latency of traffic paths in the second plurality of switching nodes,
the first plurality of switching nodes follows the first routing objective within the determined constraints in routing traffic by balancing load in the first plurality of switching nodes while artificially increasing latency on links in the first plurality of switching nodes such that the second plurality of switching nodes does not use the links having the artificially increased latency in routing traffic in the second plurality of switching nodes, and the method further comprises,
artificially increasing, by the switching node, the latency on the links in the first plurality of switching nodes by,
(a) increasing latency on a link by a first amount if the load put on the link is greater than or equal to a capacity of the link,
(b) increasing the latency on the link by a second amount if the link has a utilization that is higher than the maximum link utilization observed after a current round of routing traffic according to the first routing objective within the developed constraints by the first plurality of switching nodes, and
(c) repeating steps (a) and (b) until the maximum link utilization in one of the first network and the second network is reduced to a utilization threshold.

7. A switching node for routing a data packet, the node comprising:
a processor configured to,
receive the data packet,
determine if a first network or a second network is a leader, the first network including a first plurality of switching nodes following a first routing objective, the second network including a second plurality of switching nodes, the second plurality of switching nodes being a sub-set of the first plurality of switching nodes, the second plurality of switching nodes following a second routing objective, at least one of the first network and the second network being an overlay network; and
if the first network is the leader,
determine constraints based on the second routing objective, and
route the data packet based on the first routing objective and the determined constraints of the second routing objective;
if the second network is the leader,
determining, by the switching node, constraints based on the first routing objective, and
routing, by the switching node, the data packet based on the second routing objective and the determined constraints of the first routing objective.

8. The switching node of claim 7, wherein
the first plurality of switching nodes follow the first routing objective within the determined constraints in routing traffic without exchanging information with the second plurality of switching nodes, and the second plurality of switching nodes follow the second routing objective in routing traffic without exchanging information with the first plurality of switching nodes.

9. The switching node of claim 7, wherein the processor determines the constraints by proactively considering a reaction of the second plurality of switching nodes following the second routing objective in routing traffic to traffic routing at the first plurality of switching nodes.

10. The switching node of claim 9, wherein
the first routing objective is to at least one of balance load in one of the first network and the second network and minimize an overall cost of one of the first network and the second network,
the second routing objective is to minimize end-to-end latency of traffic paths in the second plurality of switching nodes, and
the first plurality of switching nodes follow the first routing objective within the determined constraints in routing traffic by balancing load in the first plurality of switching nodes while maintaining traffic paths in the first plurality of switching nodes at a same length such that latencies of links in the second plurality of switching nodes are not changed.

11. The switching node of claim 10, wherein the processor balances load in the first plurality of switching nodes while maintaining the traffic paths in the first plurality of switching nodes at the same length such that the latencies of the links in the second plurality of switching nodes are not changed in accordance with the following equation:

$$\min \text{Maximum } util = \max_{(x,y) \in E} \frac{\text{load}(x, y)}{\text{capacity}(x, y)}$$

subject to:

$$\sum_{(x,y) \in E} f_{(x,y)}^{(s,t)} - \sum_{(y,z) \in E} f_{(y,z)}^{(s,t)} = \begin{cases} -1, & \text{if } y = s \\ 1, & \text{if } y = t \\ 0, & \text{otherwise} \end{cases} \forall y, s, t \in E$$

$$\text{load}(x, y) = \sum_{(s,t) \in V \times V} \text{demand}(s, t) \times f_{(x,y)}^{(s,t)} \quad \forall (x, y) \in E$$

$$\sum_{(x,y) \in E} f_{(x,y)}^{(s,t)} \leq 1.02 \times H(s, t)_{prev} \quad \forall (s, t) \in V \times V$$

wherein $f_{(x,y)}^{(s,t)}$ is an amount of traffic between nodes s and t in the first plurality of switching nodes that goes over a link (x,y) between nodes x and y in the first plurality of switching nodes, load(x,y) is the load on the link (x,y), capacity(x,y) is the traffic capacity of link (x,y), demand (s,t) is a traffic demand between nodes s and t, H(s,t) is the total hopcount between nodes s and t in the first plurality of switching nodes computed as $\Sigma_{(x,y) \in E} f_{(x,y)}^{(s,t)}$, $H(s,t)_{prev}$ is the hopcount of a traffic path between nodes s and t in the first plurality of switching nodes computed in a previous iteration of load balancing, V is the set of nodes in the first plurality of switching nodes including nodes s, t, x, and y, and z, and E is the set of links in the first plurality of switching nodes including the links (x,y) and (y,z).

12. The switching node of claim 9, wherein
the first routing objective is to at least one of balance load in one of the first network and the second network and minimize an overall cost of one of the first network and the second network,
the second routing objective is to minimize end-to-end latency of traffic paths in the second plurality of switching nodes,
the first plurality of switching nodes follows the first routing objective within the determined constraints in routing traffic by balancing load in the first plurality of switching nodes while artificially increasing latency on links in the first plurality of switching nodes such that the second plurality of switching nodes does not use the links having the artificially increased latency in routing traffic in the second plurality of switching nodes, and
the processor artificially increases the latency on the links in the first plurality of switching nodes by,
(a) increasing latency on a link by a first amount if the load put on the link is greater than or equal to a capacity of the link,
(b) increasing the latency on the link by a second amount if the link has a utilization that is higher than the maximum link utilization observed after a current round of routing traffic according to the first routing objective within the developed constraints by the first plurality of switching nodes, and
(c) repeating steps (a) and (b) until the maximum link utilization in one of the first network and the second network is reduced to a utilization threshold.

\* \* \* \* \*